July 13, 1926.
C. H. BERILL
MEASURING INSTRUMENT
Filed Nov. 15, 1924
1,592,621
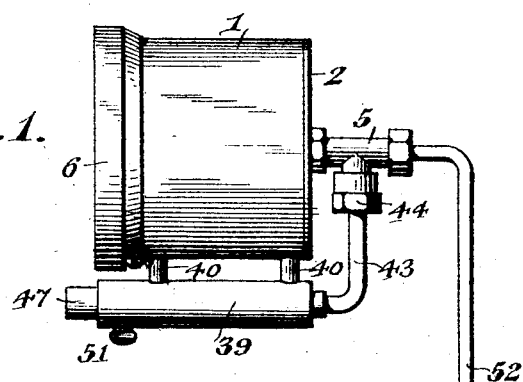
*Fig.1.*
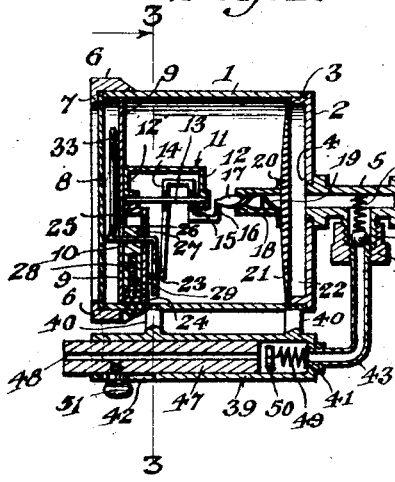
*Fig.2.*
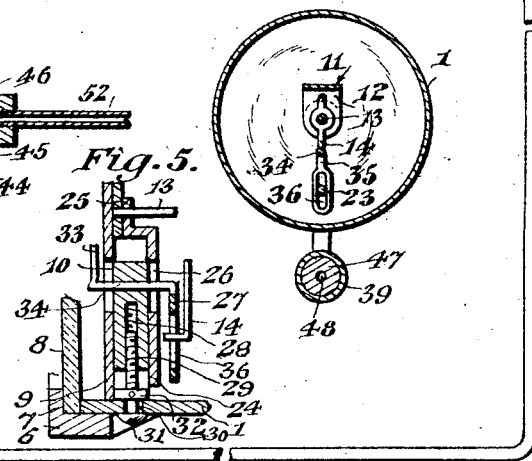
*Fig.3.*
*Fig.5.*
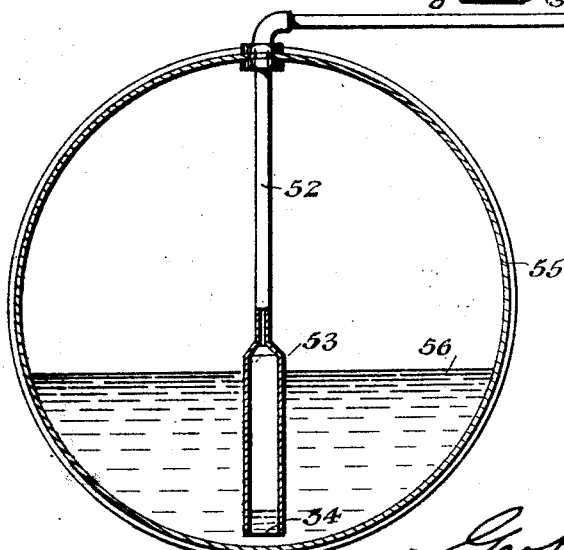
*Fig.4.*
INVENTOR.
Carroll H. Berill,
BY
Geo. P. Kimmel ATTORNEY.

Patented July 13, 1926.

1,592,621

UNITED STATES PATENT OFFICE.

CARROLL H. BERILL, OF BUFFALO, NEW YORK, ASSIGNOR TO BERILL MFG. COMPANY, INC., A CORPORATION OF NEW YORK.

MEASURING INSTRUMENT.

Application filed November 15, 1924. Serial No. 750,199.

This invention relates to the class of measuring instruments and pertains particularly to a diaphragm controlled means for indicating the quantity of liquid in a receptacle.

The primary object of this invention is the provision, in a manner as hereinafter to be set forth, of a liquid volume indicating device adapted particularly for use upon automobile vehicles to indicate the quantity of gasoline contained in the gasoline tank of the machine, the device being operated by the column of air trapped in a tube, one end of which extends into and terminates in close proximity to the bottom of the receptacle, the air pressure in the receptacle being increased against a diaphragm in the gauge body as the fluid in the tank rises and forces the trapped air ahead of it in the tube.

Another object of the invention is the provision, in a manner as hereinafter set forth, of a liquid indicating device having means whereby the indicating finger can be adjusted to set the same to indicate the quantity of gasoline in tanks of varying sizes and shapes.

Still another object of the invention is the provision, in a manner to be hereinafter set forth, of a liquid gauge having means associated therewith whereby corrections can be made for barometric interference in the accuracy of the readings of the instrument.

A further and final object of the invention is the provision, in a manner as hereinafter set forth, of a liquid gauge of simple construction, efficient, durable, easily and quickly installed and inexpensive to manufacture and set up.

The invention will be best understood from a consideration of the following detailed description taken in connection with the accompanying drawings forming a part of this specification, with the understanding that the invention is not confined to any strict conformity with the showing of the drawings but may be changed and modified so long as such changes and modifications mark no material departure from the salient features of the invention as expressed in the appended claims.

In the drawings:

Figure 1 is a side elevation of the device embodying this invention showing the tube connecting therewith and extending from a liquid tank, which tank is shown in section.

Figure 2 is a central longitudinal section through the device.

Figure 3 is a transverse section taken upon the line 3—3 of Figure 2.

Figure 4 is a front elevation of the device, and,

Figure 5 is an enlarged detail sectional view of an adjustment for the indicator finger.

Referring now to the drawings in detail wherein like numerals of reference indicate corresponding parts throughout the several views, a casing or housing is indicated at 1, which casing may be circular as shown, although this is not essential. This casing 1 has a removable back 2 which back is provided with an annular flange 3 which fits air tight within the casing, as shown in Figure 2. A centrally located threaded aperture 4 is formed in the back 2 and in this aperture one arm of a three-way coupling 5 is threaded. The front of the casing 1 has secured thereover a frame comprising an annular portion 6 which engages about the outside of the casing 1, and an inwardly projecting flange 7 which overhangs the front edge of the casing and serves to retain in position across the front of the casing the cover glass 8. Within the casing 1 spaced a slight distance from the cover glass 8 is a partition 9 having a vertical slot 10 therethrough just below the central portion thereof, as shown in Figure 2.

Within the casing 1 there is mounted a bracket member indicated generally by the numeral 11, this bracket member as shown having a relatively long horizontal arm and right angled depending arms 12 and 12', respectively. The arm 12', as shown, is secured against the back of the partition 9, thus supporting the bracket as shown in the central portion of the casing. The lower part of the arm 12' has an aperture therethrough which is positioned upon the longitudinal axis of the casing and, the arm 12 also has an aperture therein, likewise upon the central longitudinal axis of the casing.

Revolubly supported at each end by the arms 12 and 12' is a shaft 13 which, being held in the apertures in the arms 12 and 12', is upon the central longitudinal axis of the casing.

Secured upon the shaft 13 to revolve therewith, is a crank member having three arms 14, 15 and 16, respectively, the arms 14 and 15, as shown, having the shaft extending therethrough, while the arm 16 has its terminal end in alignment with the shaft 13 and has extending therefrom a spiral 17 formed by tortionally twisting. This spiral 17, as shown, is in alignment with the shaft 13 and extends into a tubular member 18 in the inner wall of which there is formed the spiral groove 19 into which the spiral 17 fits. This tubular member 18 has the laterally extending angular flange 20 formed thereon, which flange is secured to the inner face of a diaphragm 21 and cemented or otherwise appropriately secured across the cylinder 1 upon the edge of the flange 3 of the back 2. There is thus formed an expansion chamber 22 in the rear part of the casing 1 into which chamber one arm of the three-way coupling 5 opens.

The arm 14 of the crank member is extended a substantial distance, as shown, and terminates in the right angled forwardly extending finger 23.

Positioned below the bracket 11 is a standard 24 which is spaced from the partition 9 at the lower end and at the upper end is inturned and secured against the inner face of the depending portion 12′ of the bracket, as indicated at 25. The shaft 13 has one end extending through this portion 25, which is secured against the inner face of the leg 12′. A longitudinal slot is formed in the standard 24, as indicated at 26, which slot is parallel and in alignment with the slot 10 in the partition 9.

Positioned between the diaphragm 9 and the standard 24 is a vertically shiftable bearing block 27 positioned, as shown, and having a longitudinally extending threaded bore 28 therein, opening upwardly from the lower end. Engaged in this threaded bore 28 is a shift screw 29, the shank of which extends downwardly and through an aperture 30 in the under side of the casing 1, and the head 31 of the screw bears against the outer side of the casing, while upon the inner side there is secured about the shank of the screw, a collar 32, which bears against the inner face of the casing. The screw 29 is thereby held against longitudinal movement in the slot 30 but allowed to revolve therein to move the block 27 up or down as desired.

Positioned between the glass 8 and the partition 9 is an indicating finger 33, the lower portion of which is bent at right angles to provide the supporting shaft 34 which shaft extends through the slot 10, through the upper portion of the shiftable block 27 and through the slot 26 in the standard 24 and within the casing 1 extends downwardly to provide the arm 35 having the longitudinally extending slot 36 in the lower end thereof and in which slot the finger 23 of the crank arm 14 extends, as shown.

The indicator finger 33 can be shifted vertically across the outer face of the partition 9 which has graduations 38 thereon and constitutes an indicator dial, to give a greater throw to the depending arm 35, or lesser throw as may be desired, to set the instrument for use in various types of tanks. It can be easily seen that upon revolution of the screw 29 the block 27 will be shifted up or down as desired to carry with it the horizontal shaft 34 and thus raise and lower the indicator finger 33, as explained, the elongated slot 36 allowing the finger 23 to be located close to the shaft 34 to decrease the swing of the finger 33 or adjacent the outer end of the arm 35 away from the shaft 34 to increase the swing of the indicator finger.

Positioned below and extending longitudinally of the casing 1, is a cylinder 39 supported from the casing 1 by means of depending arms or lugs 40, and having its forward end open and its rear end provided with a threaded aperture 41. The cylinder 39 has a longitudinally extending slot 42 formed through its wall upon the under side thereof. The rear end of the cylinder 39 is connected by means of a tube 43 to one arm of the three-way coupling 5 and secured to this arm by means of the nut 44. A ball valve 45 controlled by a spring 46 within the coupling 5 acts to keep the end of the tube 43 normally closed against escape of air from the expansion chamber 22.

Within the cylinder 39 there is placed a solid piston 47 having the central longitudinal aperture 48 extending therethrough and, between the inner end of the piston 47 and the back of the cylinder 39, is located an expansion spring 49 carrying upon its forward end a leather or rubber closure disk 50. A screw 51 is threaded into the piston 47 and extends through the slot 42 and serves to retain the piston in position and limit its stroke. By means of this piston, connecting tube and ball valve 45, barometric interference on the accuracy of the readings is eliminated by removing the air contained in the instrument and its conduit before reading.

Threadably connected with the third arm of the three-way coupling 5 is an air tube 52 of proper length, having its terminal end of enlarged diameter as indicated at 53 and open at the lower end as at 54. This enlarged end 53 of the air tube 42 is adapted to be located within a tank 55 in which a fluid is stored.

The operation of the device is as follows:

When the tank 55 is empty of fluid, the diaphragm 21 will be approximately in the position indicated in Figure 2 and, when fluid 56 is run into the tank 55, it will rise in the tube, and in rising therein the air normally to be found in the tube will be trapped therein and compressed as the fluid 56 rises. The diaphragm 21 being the only expansible element in the device, the compressed air will collect in the chamber 22 and cause the diaphragm 21 to be expanded inwardly of the casing 1, thus forcing the tubular portion 18 toward the front of the casing. When the portion 18 is thus moved the spiral 17 will be revolved swinging the crank arms 14 and 15 upon the shaft 13 and causing the actuating finger 23 to swing the arm 35, thus moving the pointer 33 across the face of the dial indications formed upon the outer side of the partition 9. Before taking the readings of the instrument the barometric interference must be overcome and this is accomplished by renewing the air in the conduit 52 by means of the pump 39. The piston 47 is forced inwardly, forcing air through the tube 43 and into the conduit 52 to expel the gasoline from the lower end of the conduit thus expelling the air from the conduit at the open end 54 through the gasoline 56 contained in the tank.

From the foregoing description it will be seen that a novel, substantial and accurate indicating device is provided which will give at all times accurate readings to indicate the volume of the contents of the tank to which it is attached.

Having thus described my invention what I claim is:

1. In a liquid gauge, a casing, a tube opening at one end into said casing and designed to be extended into a fluid container, a dial in said casing, a pointer for said dial, a diaphragm in said casing overlying the open end of said tube and operated by air entering therebehind from said tube to swing said pointer, and a shiftable element supporting and designed to shift said pointer to vary the throw of the same to set the gauge for various purposes.

2. In a liquid gauge, a casing having an inlet, a calibrated dial in and adjacent one end thereof, an expansible diaphragm secured across the interior of said casing adjacent the other end thereof, to set up an expansion chamber for fluid admitted through the inlet, a pointer overlying the face of said dial and having a portion thereof extending through and beyond the back thereof, a bearing for said extended pointer portion, an interiorly spirally grooved tubular member mounted upon said diaphragm, and a revolubly mounted crank element having one end engaging the extended inner end of said pointer and its other end spiraled to work in said groove.

3. In a liquid gauge, a casing having an inlet, a calibrated dial in and adjacent one end thereof, an expansible diaphragm secured across the interior of said casing adjacent the other end thereof, to set up an expansion chamber for fluid admitted through the inlet, a pointer overlying the face of said dial and having a portion thereof extending through and beyond the back thereof, a bearing for said extended pointer portion, an interiorly spirally grooved tubular member mounted upon said diaphragm, and a revolubly mounted crank element having one end engaging the extended inner end of said pointer and its other end spiraled to work in said groove, said bearing for said pointer being shiftable to vary the amount of swing imparted thereto by said crank.

4. In a liquid gauge, a casing having a fluid inlet, a calibrated dial in and adjacent one end thereof, an expansible diaphragm secured across the interior of said casing and adjacent the other end thereof to set up an expansion chamber for fluid admitted through the inlet, a pointer overlying the face of said dial and having a right angled intermediate portion extending through the dial and further having a parallel inner end portion, a bearing engaging said intermediate portion, a revoluble shaft mounted within and upon the longitudinal axis of said casing, a revoluble crank member fixed upon said shaft and having one end thereof in loose connection with said inner end portion and having its other end spiraled, and a tubular interiorly spiraled member mounted upon said diaphragm and having said spiraled end fitted to work therein.

5. In a liquid gauge, a casing having a fluid inlet, a calibrated dial in and adjacent one end thereof, an expansible diaphragm secured across the interior of said casing adjacent the other end thereof to set up an expansion chamber for fluid admitted through the inlet, a pointer overlying the face of said dial and having a right angled intermediate portion extending through the dial and further having a parallel inner end portion, a bearing engaging said intermediate portion, a revoluble shaft mounted within and upon the longitudinal axis of said casing, a revoluble crank member fixed upon said shaft and having one end thereof in loose connection with said inner end portion and having its other end spiraled, and a tubular interiorly spiraled member mounted upon said diaphragm, having said spiraled end fitted to work therein, said bearing being vertically adjustable to vary the amount of swing imparted to the pointer by said connected crank member.

In testimony whereof, I affix my signature hereto.

CARROLL H. BERILL.